(No Model.)

C. J. SPINDLE.
HORSE DETACHER.

No. 281,938. Patented July 24, 1883.

WITNESSES:
Fred G. Dieterich
Arthur L. Morsell

Clarence J. Spindle
INVENTOR.
By Louis Bagger & Co.
ATTORNEYS.

UNITED STATES PATENT OFFICE.

CLARENCE J. SPINDLE, OF LORETTO, VIRGINIA.

HORSE-DETACHER.

SPECIFICATION forming part of Letters Patent No. 281,938, dated July 24, 1883.

Application filed June 2, 1883. (No model.)

*To all whom it may concern:*

Be it known that I, CLARENCE J. SPINDLE, a citizen of the United States, and a resident of Loretto, in the county of Essex and State of Virginia, have invented certain new and useful Improvements in Horse-Detachers; and I do hereby declare that the following is a full, clear, and exact description of the invention, which will enable others skilled in the art to which it appertains to make and use the same, reference being had to the accompanying drawings, which form a part of this specification, and in which—

Figure 1:
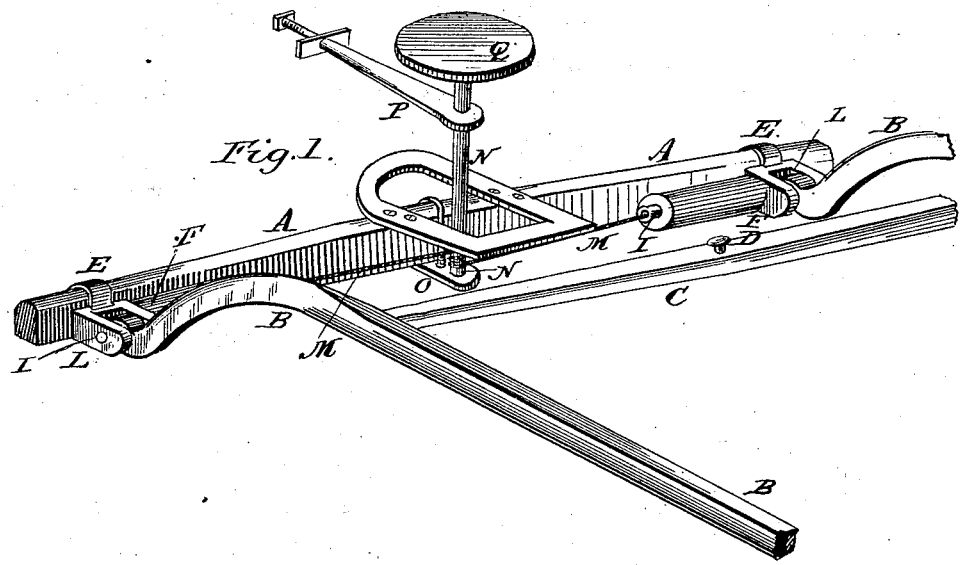
Figure 2:
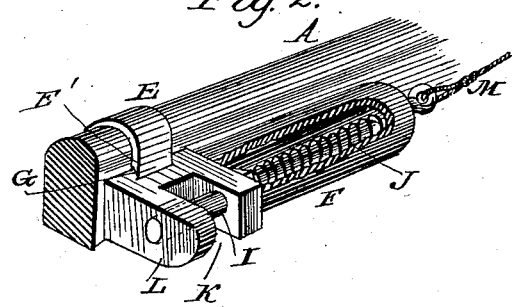
Figure 3:
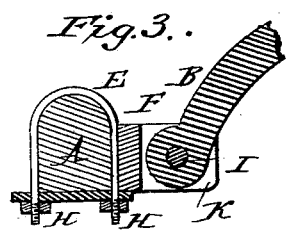
Figure 4:
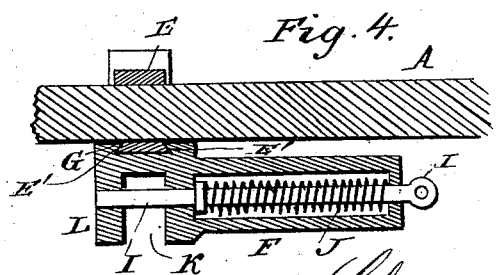

Figure 1 is a perspective view of the front axle of a vehicle provided with my improved device for detaching the shafts. Fig. 2 is a detail view of one of the ends of the axle, showing one of the spring-fastenings and its clip. Fig. 3 is a cross-section through the clip and the spring-containing box, and Fig. 4 is a longitudinal sectional view of the same.

Similar letters of reference indicate corresponding parts in all the figures.

My invention has relation to that class of devices for detaching horses in which the eyes of the thill-irons are held hinged in their clips by sliding spring-bolts, which may be withdrawn, releasing the thills; and it consists in the detailed construction and combination of parts of such a device, which may be fitted upon the clips of a front axle of any construction and used with thill-irons of the usual construction, as hereinafter more fully described and claimed.

In the accompanying drawings, A represents the front axle of a vehicle equipped with my improved detaching device, and B are the shafts, connected by the cross-bar C, upon which the single-tree is pivoted on the bolt D, as usual. Clipped upon opposite ends of the axle by clips E, the front arm of which has its edges E' beveled inward, are boxes F, made of malleable iron, cast-iron, or other suitable material, which are made with dovetailed recesses G, adapted to fit upon the clips E, as will appear more clearly by reference to Fig. 4 of the drawings, whereby the boxes will be held firmly in place upon the axle. In order to remove them, all that is necessary is to unscrew the clip-nuts H, when the clips may readily be lifted out of their recesses in the boxes, and the latter detached from their respective ends of the axle.

Arranged inside of each of the boxes F is a spring-bolt, I, actuated by its encircling spring J. The outer end of the spring-bolt projects into the recess K, with its free end projecting into a hole in the lip L. The inner end of each of the spring-bolts is connected by a cord or chain, M, with the rotary shaft N, the lower end of which is stepped in a bracket, O, clipped upon the middle of the axle, while its upper end is inserted through a bracket, P, fastened to the fore part of the wagon-box. Upon the upper end of shaft N is a hand-wheel or handle, Q, for turning it.

From the foregoing description, taken in connection with the drawings, the operation of this device will be readily understood without requiring extended explanation. If it is desired to detach the shafts, all that is necessary to do is to turn the hand-wheel, which is within easy reach of the driver, when the spring-bolts which fasten the shafts to the axle will be withdrawn from the cockeyes, and thus release the shafts. Inasmuch as the boxes F and their appurtenances are fastened to the axle by clips E, it will be seen that they may be applied upon the axle or double-tree of any vehicle of ordinary construction, whether adapted for use with a single team or double team, without requiring any alteration or change of parts. These boxes, with their clips, may be sold as separate articles of manufacture at a small expense, together with the means for operating the springs, and may be placed in operative position upon any vehicle by any person of ordinary intelligence.

It will also be seen that by having the bolts sliding in boxes integral with the lips, between which the thill-eyes are hinged, and having the said boxes closed, the bolts and springs are protected from being clogged by dust or mud from the road, and the entire box and bolt may be attached at once, by simply sliding the dovetailed recess over the correspondingly-shaped arm of the clip, which thereupon is secured upon the axle in the usual manner.

Having thus described my invention, I claim and desire to secure by Letters Patent of the United States—

1. The combination, in a horse-detacher of the described class, of the clips fitting upon the front axle of a vehicle, and having inwardly-beveled edges upon its front arm, and the boxes having the dovetailed recesses, and sliding bolts provided with means for withdrawing them, as and for the purpose shown and set forth.

2. In a horse-detacher, the combination of the clips adapted to be secured upon the front axle of a vehicle, and having the edges of the forward arms beveled inward, the boxes having the dovetailed recesses in their rear portions, forming transverse recesses in one end between two perforated lips, and having closed cylindrical boxes projecting laterally from the inner lips, the spring-bolts sliding in the said boxes, having the springs and their middle portions inclosed in the said boxes, and the ends projecting through the ends of the boxes, the means for withdrawing the bolts, and the thills having the eyes into which the outer ends of the bolts fit, as and for the purpose shown and set forth.

In testimony that I claim the foregoing as my own I have hereunto affixed my signature in presence of two witnesses.

CLARENCE J. SPINDLE.

Witnesses:
LOUIS BAGGER,
ARTHUR L. MORSELL.